J. HAIGH.
GALVANIC BATTERY.
APPLICATION FILED AUG. 9, 1912.
1,073,753.
Patented Sept. 23, 1913.
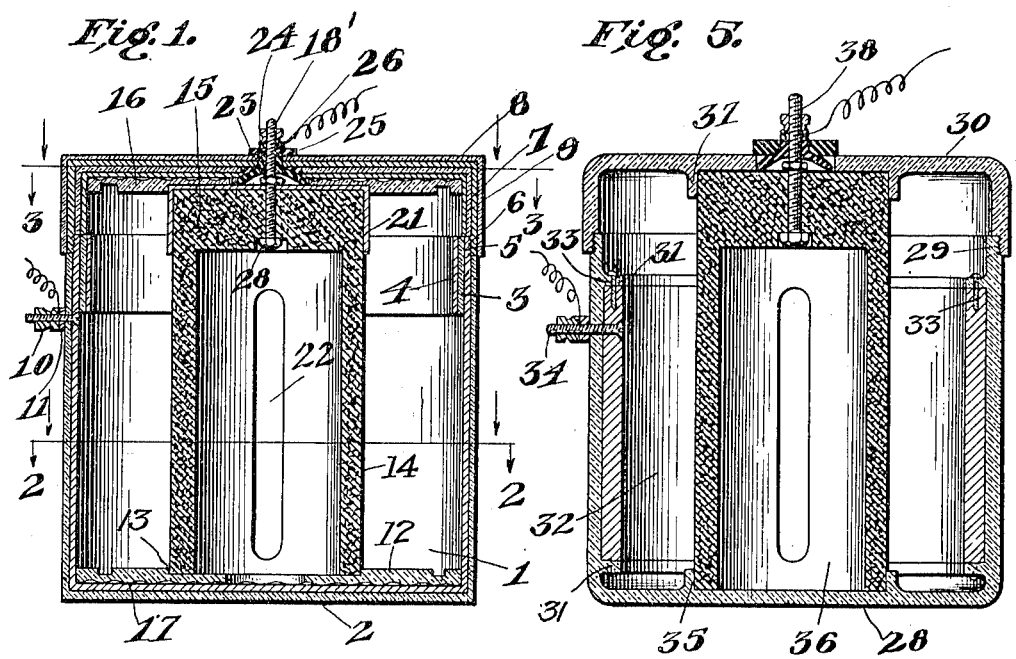
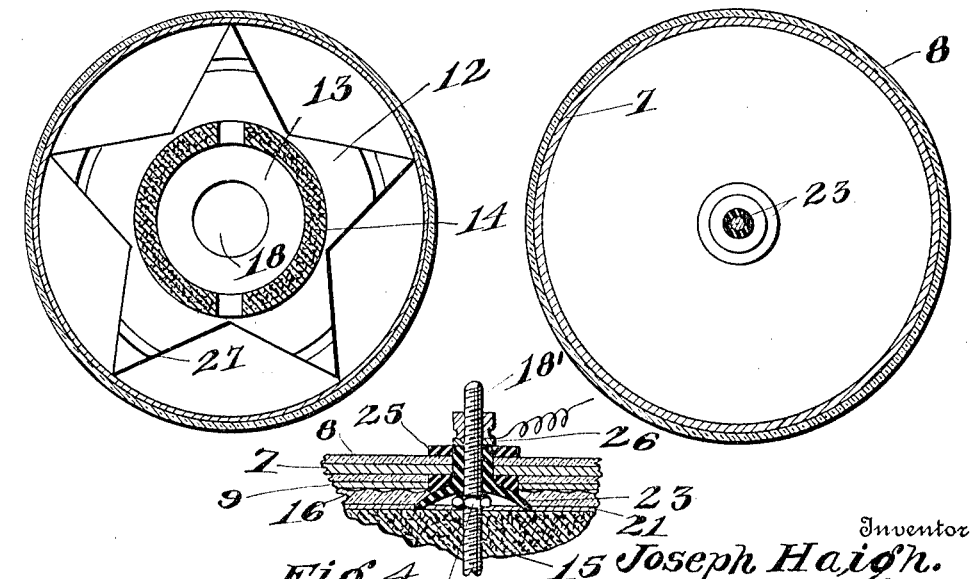
Inventor
Joseph Haigh.
Witnesses
By E. B. Stocking
Attorney

UNITED STATES PATENT OFFICE.

JOSEPH HAIGH, OF MUSKOGEE, OKLAHOMA, ASSIGNOR OF ONE-HALF TO JOSIAH H. CHILDERS, OF MUSKOGEE, OKLAHOMA.

GALVANIC BATTERY.

1,073,753.  Specification of Letters Patent.  Patented Sept. 23, 1913.

Application filed August 9, 1912. Serial No. 714,218.

*To all whom it may concern:*

Be it known that I, JOSEPH HAIGH, citizen of the United States of America, residing at Muskogee, in the county of Muskogee and State of Oklahoma, have invented certain new and useful Improvements in Galvanic Batteries, of which the following is a specification.

This invention relates to certain new and useful improvements in galvanic batteries, the object being to provide a battery which is exceedingly simple and cheap in construction, and one which is very compact in form; the electrodes and electrolyte being contained within a vessel forming the positive electrode.

Another object of my invention is to provide a battery in which an electrolyte is used, composed of a number of ingredients which are exceedingly cheap, whereby the cost of the battery is reduced and at the same time the life of the same is greatly increased.

Other and further objects and advantages of the invention will be hereinafter set forth and the novel features thereof defined by the appended claims.

In the drawings—Figure 1, is a vertical transverse section through a galvanic battery constructed in accordance with my invention; Fig. 2, is a horizontal section taken on the line 2—2 of Fig. 1; Fig. 3, is a horizontal section taken on the line 3—3 of Fig. 1; Fig. 4, is a detail vertical enlarged section showing the binding post and manner of connecting the same to the negative electrode and the cover of the jar; and Fig. 5, is a vertical transverse section through a modified form of battery.

In carrying out my improved invention, I employ a cylindrical vessel or container 1, preferably formed of iron of medium hardness, forming the positive electrode, said jar having its outer face coated with any suitable insulating material 2 which is also extended into the interior at the upper portion thereof, as shown at 3, said portion having a coating of paraffin 4. The upper portion of the jar or electrode 1, is provided with exterior threads 5 over which are arranged the interiorly threaded portions 6 of a metal cover 7, the inner and the outer face being covered by insulating material 8, and the inner face thereof is also provided with a paraffin coating 9. From the above description, it will be seen that I have provided a cylindrical positive electrode which forms a container for the electrolyte, as will be hereinafter fully described. Arranged in one of the walls of the cylindrical electrode 1 is a binding post 10 which is preferably provided with a plug-shaped head 11, as clearly shown in Fig. 1, said binding post extending through the insulation, as clearly shown.

Arranged within the electrode 1 is a star-shaped insulating plate 12, the points of which are adapted to engage the inner wall of the electrode 1 and said star-shaped plate is provided with a central recess 13, in which is adapted to be seated the negative electrode 14, which is cylindrical in form, and is formed of carbon of medium softness, and of such size that an annular chamber will be formed in the jar or electrode. The electrode 14 is provided with a solid head 15, which is adapted to be seated in a circular recess in an insulating plate 16 constructed in substantially the same manner as the plate 12, and said insulating plates 12 and 16 are preferably formed of glass, and are provided with corrugated faces 17, adapted to contact with the bottom of the jar and the paraffin inner face of the cap thereof, respectively. The plates are provided with central openings, as shown at 18, and extending through the central opening of the plate 16, is a binding post 18' arranged within the bore formed in the head 15, of the negative electrode 14, the head of the post 18' being seated in a recess as shown at 19. The head of the electrode 14 is provided with a cap of paraffin 21 which doubly insulates the same and the cylindrical negative electrode is provided with longitudinally oppositely disposed slots 22 in order to allow a free circulation of the electrolyte or exciting fluid within the container so as to expose the inner and outer faces of the cylindrical electrode to the action of the exciting fluid.

The cap of the jar 1 is provided with a central opening through which extends an insulating nipple 23 mounted upon the binding post and secured in position by a nut 24 carried by the binding post, which also secures the cap 21 on the head of the electrode. To thoroughly protect the binding post in order to obtain proper insulation between the positive and negative electrodes,

lindrical electrode and a cylindrical carbon electrode arranged concentrically, insulating supporting plates for centering the carbon electrode within the metal electrode, each plate having a corrugated face, and binding posts carried by the respective electrodes and insulated from the container as set forth.

7. A galvanic battery, comprising a positive electrode in the form of a container having a detachable cap, said cap and container having an insulated outer face, star-shaped plates arranged within said container and cap having recesses, a negative electrode arranged within the recesses of said plates, and means for insulating said negative electrode from the positive electrode.

In testimony whereof I affix my signature in presence of two witnesses.

JOSEPH HAIGH.

Witnesses:
J. HOUSTON CHILDERS,
JAMES M. NUTHIS.

Copies of this patent may be obtained for five cents each, by addressing the "Commissioner of Patents, Washington, D. C."